United States Patent
Mann et al.

(10) Patent No.: US 9,894,182 B2
(45) Date of Patent: Feb. 13, 2018

(54) EXTENSIONS TO STANDARD DIAMETER ROUTING

(71) Applicant: ALCATEL-LUCENT CANADA INC., Ottawa (CA)

(72) Inventors: Robert A. Mann, Carp (CA); Aaron Ferguson, Ottawa (CA); Satvinder Bawa, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 219 days.

(21) Appl. No.: 14/937,324

(22) Filed: Nov. 10, 2015

(65) Prior Publication Data

US 2017/0134522 A1   May 11, 2017

(51) Int. Cl.
| | |
|---|---|
| G06F 15/16 | (2006.01) |
| H04L 29/08 | (2006.01) |
| H04L 12/725 | (2013.01) |
| H04L 12/24 | (2006.01) |
| H04L 12/14 | (2006.01) |

(52) U.S. Cl.
CPC ........ H04L 67/327 (2013.01); H04L 41/0893 (2013.01); H04L 45/304 (2013.01); H04L 12/1407 (2013.01)

(58) Field of Classification Search
CPC .......................... H04L 67/327; H04L 67/1078
USPC ........................................... 370/252; 709/206
See application file for complete search history.

(56) References Cited

U.S. PATENT DOCUMENTS

| | | | | |
|---|---|---|---|---|
| 2009/0245240 A1* | 10/2009 | Mao | ........................ | H04L 45/00 370/352 |
| 2012/0158872 A1* | 6/2012 | McNamee | .............. | H04L 69/40 709/206 |
| 2012/0224531 A1* | 9/2012 | Karuturi | ............... | H04W 40/02 370/328 |
| 2013/0173823 A1* | 7/2013 | Mann | ...................... | G06F 11/00 709/240 |
| 2013/0322429 A1* | 12/2013 | Mann | .................. | H04L 65/1003 370/352 |
| 2013/0325983 A1* | 12/2013 | Brady | ...................... | H04L 51/38 709/206 |
| 2013/0326001 A1* | 12/2013 | Jorgensen | ........... | H04L 67/1097 709/213 |
| 2015/0063130 A1* | 3/2015 | Vihtari | ................ | H04L 67/1097 370/252 |

\* cited by examiner

*Primary Examiner* — Frantz Jean
(74) *Attorney, Agent, or Firm* — Kramer & Amado, P.C.

(57) ABSTRACT

Various exemplary embodiments relate to a Diameter Routing Agent (DRA) for processing a Diameter message, the DRA including: a rule storage configured to store a plurality of sets of rules and plugins; a Diameter stack configured to receive a Diameter message; a message handler configured to: determine whether there is a destination selection associated with the Diameter message; when the destination selection is associated with the Diameter message, routing the Diameter message according to a plugin by determining by the plugin, whether there is a routing configuration match by evaluating a set of filters in the plugin; and transmitting a message based on the evaluation of the plugin.

20 Claims, 4 Drawing Sheets

EXTENSIONS TO STANDARD DIAMETER ROUTING

TECHNICAL FIELD

Various exemplary embodiments disclosed herein relate generally to computer networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Diameter Routing Agent (DRA) for processing a Diameter message. The method includes receiving a Diameter message at the DRA; determining whether there is a destination selection associated with the Diameter message; when the destination selection is associated with the Diameter message, routing the Diameter message according to a plugin by determining by the plugin, whether there is a routing configuration match by evaluating a set of filters in the plugin; and transmitting a message based on the evaluation of the plugin.

Various exemplary embodiments relate to a Diameter Routing Agent (DRA) for processing a Diameter message, the DRA including: a rule storage configured to store a plurality of sets of rules and plugins; a Diameter stack configured to receive a Diameter message; a message handler configured to: determine whether there is a destination selection associated with the Diameter message; when the destination selection is associated with the Diameter message, routing the Diameter message according to a plugin by determining by the plugin, whether there is a routing configuration match by evaluating a set of filters in the plugin; and transmitting a message based on the evaluation of the plugin.

Various exemplary embodiments relate to a non-transitory machine-readable storage medium encoded with instructions for execution by a Diameter Routing Agent (DRA) for processing a Diameter message, the medium includes, instructions for receiving a Diameter message at the DRA; instructions for determining whether there is a destination selection associated with the Diameter message; instructions for when the destination selection is associated with the Diameter message, routing the Diameter message according to a plugin by determining by the plugin, whether there is a routing configuration match by evaluating a set of filters in the plugin; and instructions for transmitting a message based on the evaluation of the plugin.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior.

The DRA may support standard diameter realm-based routing, and the routing logic may be implemented by the diameter protocol stack used by the DRA. Some networks do not use multiple realms, so realm-based routing may be of no value. Additionally, the routing decisions made by the Diameter protocol stack may be typically made after application code has completed, so application code may have no way to check on the routing decision or make any modifications to the message after the routing decision has been made.

Lack of realms in certain networks eliminates the ability to do realm based routing. For example, the desire to do 'egress throttling' (limit how many messages are sent to a destination) similarly cannot be implemented as the peer/destination is not known to application code, as the routing decision is made after application code processing of the message is complete. Standard diameter routing also does not support patterns when matching destinations.

Embodiments are described herein that include the new concept of 'host routes'. A host route is the same as a normal diameter route except that the destination value specified is expected to be a Destination-Host, not a Destination-Realm. These embodiments similarly may include a configuration class which may be defined to hold information used to specify how to make routing decisions. The embodiments additionally may include routing logic implemented by application code, where the diameter stack is instructed through a specific Application Programming Interface (API) as to what peer to send a request to in order to route the request forward. While embodiments will be described in the context of DRA's, the features of these embodiments may also be applied to any network element implementing a Diameter application.

Figure 1:
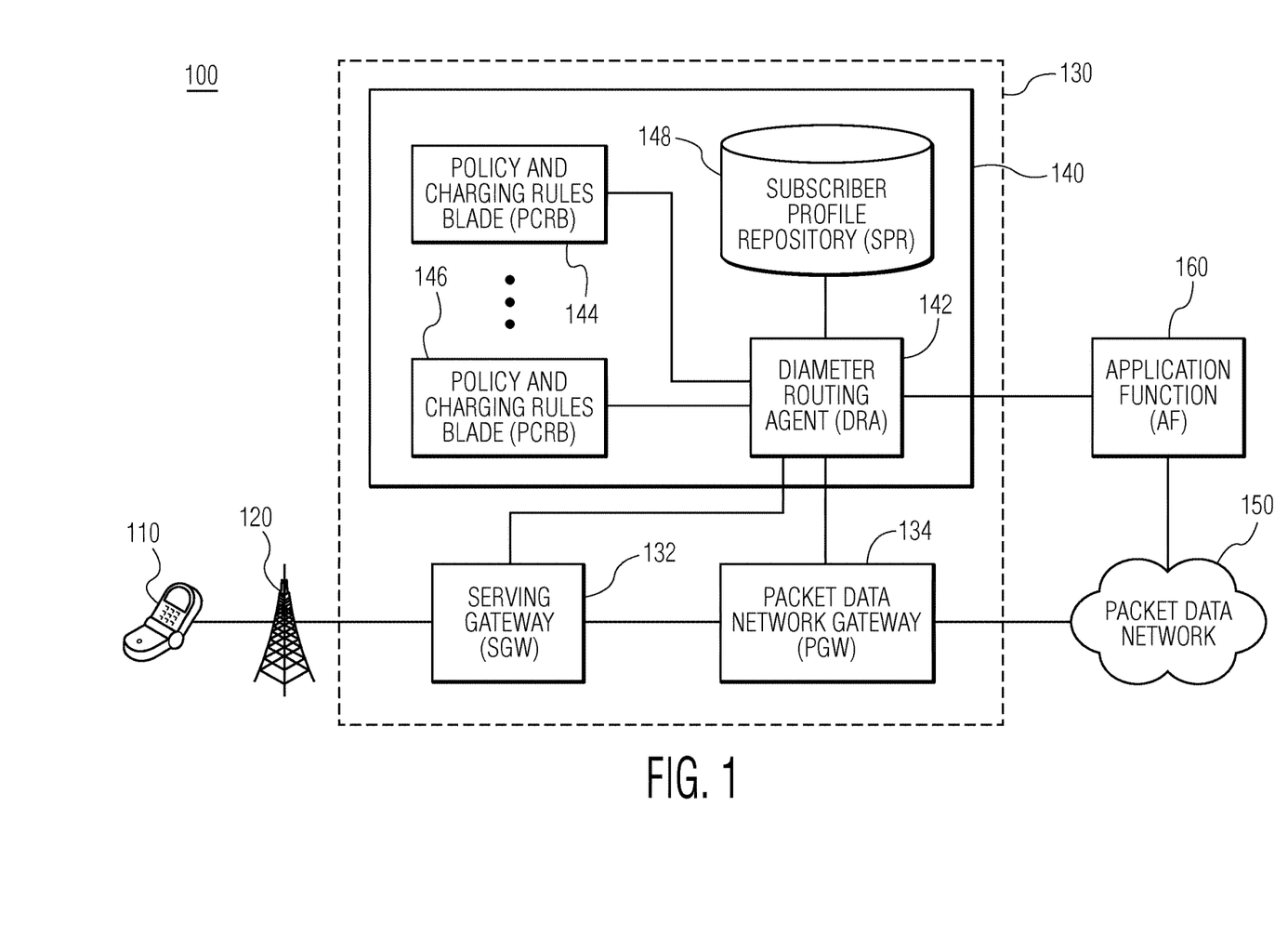
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
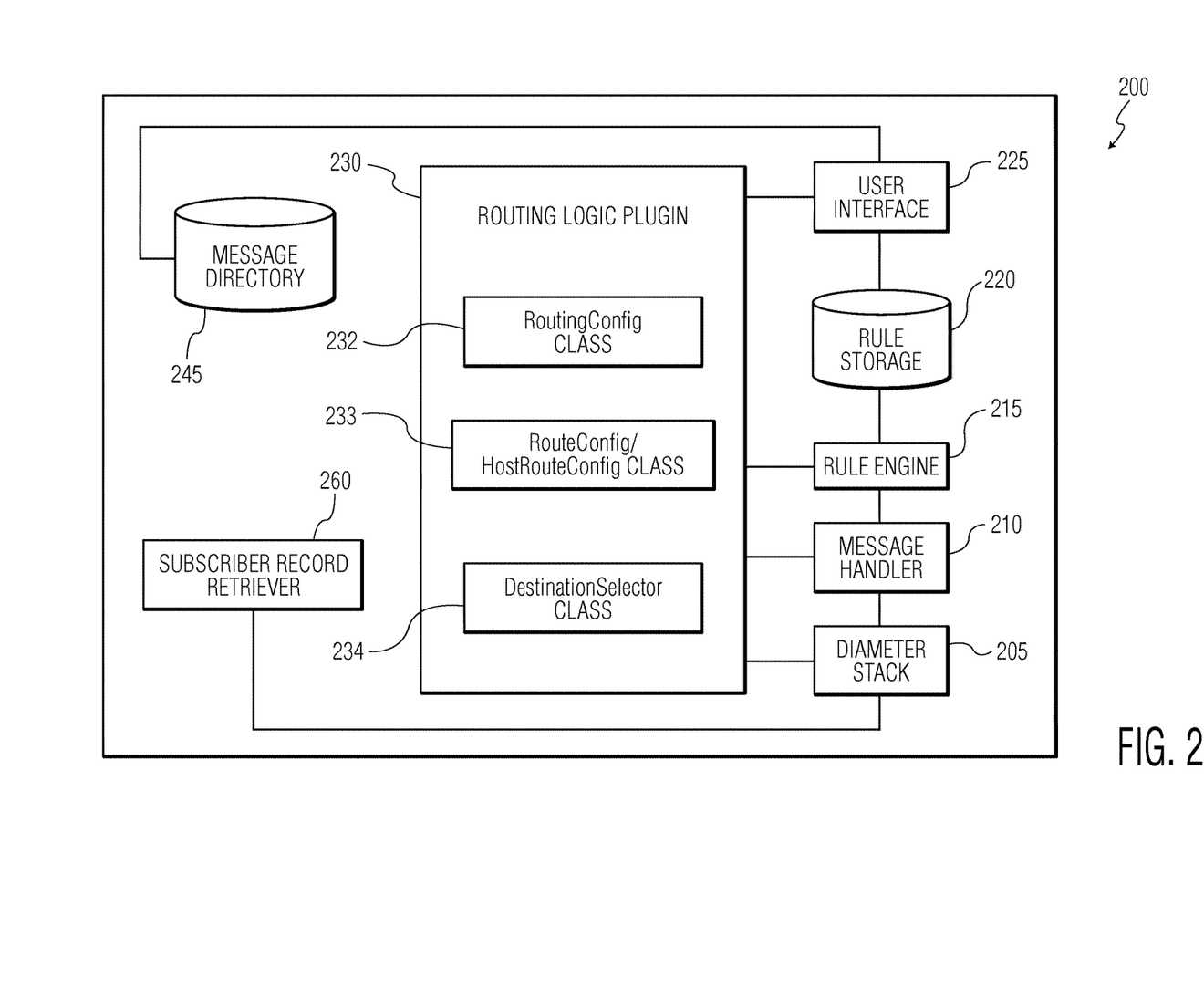
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, routing logic plugin 230, message dictionary 245, or subscriber record retriever 260.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structure for storing a rule set will be apparent.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art. For example, user interface 225 may enable a user to customize plugins such as routing logic plugin 230.

The contents of Diameter messages may vary depending on the application and command type. For example, an RX RAA message may include different data from a GX CCR message. Such differences may be defined by various standards governing the relevant Diameter applications. Further, some vendors may include proprietary or otherwise non-standard definitions of various messages.

Message dictionary 245 may be any machine-readable medium. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary 245, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions.

Subscriber record retriever 260 may include hardware or executable instructions on a machine-readable storage medium configured to communicate with a subscriber profile repository (SPR) via Diameter stack 205 to retrieve a subscriber record for a Diameter message. Such communication may be performed, for example, according to the Sp application. Various methods of implementing subscriber record retriever 260 will be apparent.

Routing logic plugin 230 may include hardware or executable instructions on a machine readable storage medium. Routing logic plugin may be configured to interact with any of diameter stack 205, message handler 210, rule engine 215, and user interface 225. Routing logic plugin 230 may include routingconfig class 232, RouteConfig/HostRouteConfig Class 233, and destinationselector class 234. Routing logic plugin 230 may allow for customized behavior for routing and resending requests based on user chosen criteria. In some embodiments diameter stack 205 may check for conditions which satisfy routing logic plugin 230 and thereafter instantiate routingconfig class 232, RouteConfig/HostRouteConfig Class 233, and/or destinationselector class 234.

Embodiments described herein introduce a new concept of 'host routes.' The idea is that a group of downstream servers may be assigned a logical identity and that identity may be used as a destination that can be routed to. 'Host routes' are then specified to route traffic to those logical destinations through specific peers. An example data structure that may be used in conjunction with the following classes includes a table as such:

TABLE 1

| Destination-Host | Diameter-Peer | Priority |
|---|---|---|
| slpe0pool.ims | slre0.ims | 1 |
| slpe0pool.ims | bbre0.ims | 2 |
| slpe0h1.ims | slre0.ims | 1 |
| slpe0h1.ims | bbre0.ims | 2 |
| slpe0h2.ims | slre0.ims | 1 |

In Table 1, Destination-Hosts may be associated with a Destination-Peer and assigned a priority accordingly.

Routing logic may be exposed as an application plugin within the plugin framework of a DRA or other network elements supporting Diameter messaging. Like all plugins, the routing plugin such as routing logic plugin 230 may sit anywhere in both the request processing chain of plugins and the response processing chain of plugins. Typically the routing plugin may sit near the end (if not at the very end) of the request chain, and at the beginning of the response chain. By allowing other plugins to be in the request chain after the routing plugin, additional message processing (such as making additional changes to the message or preventing routing of the message as part of a destination throttling feature) may be done. U.S. patent application Ser. No. 14/593,448 titled Diameter Routing Agent Application Plugin Framework to Mann, et. al. discusses an application plugin framework and is hereby incorporated by reference all purposes as if fully set forth herein.

The configuration of the routing logic plugin 230 may be done using a 'filters' concept. A filter may include an abstraction of the underlying rule engine and may allow for customized behavior in terms of routing and resending of requests based on criteria the user chooses.

RoutingConfig Class

RoutingConfig class 232 may include a filter. The filter may include a list of conditions to match that make this configuration apply to a particular message. For example "Request.Origin-Realm=='foo.bar'" or "Request.Application=Gx and Request.command=CCR". Additional configuration data associated to the filter may also include, for example, what result codes a user wants to retry on or how many times a user wants to try to resend a message.

For example, for an edge agent some peers and destinations may be close by while other destinations may be far away. Therefore logic may be added such that the filter indicates if the destination value is not the present realm, a timeout value should be a value larger than when the destination value is the present realm. Routing may thus be customized for particular networks. Similarly, specific result codes may be identified in the configuration to provide specific responses.

RoutingConfig class 232 may include a list of result codes. List<Result Codes> retryableResultCodes—may include a list of result codes that when detected in a response, indicate that the request can be resent. The result codes may be based upon protocol Result Codes or application-specific experimental results. Certain result codes may be retried, such as unable to deliver. Similarly, transient errors may be configured to resend a request.

RoutingConfig class 232 may include: Integer timeout. The timeout integer may indicate how long (in milliseconds) to wait for a request to be responded to before giving up waiting for the response. In one example, PCRF realm may be a low timeout such as 200 milliseconds, while SPR may require a larger timeout such as 2 seconds.

RoutingConfig class 232 may include: Integer numberOfSendAttempts. NumberOfSendAttempts may indicate how many times to attempt to send the request for any chosen routing decision. The routing decision may be defined later.

RoutingConfig class 232 may include: Boolean preferHostRoutes. PreferHostRoutes may indicate when using diameter/host routes to route a request, which type of route should be preferred.

RouteConfig/HostRouteConfig Class

An existing Diameter RouteConfig class may be enhanced so that the destination realm may take a value that contains a regular expression, not just an RFC-compliant destination-realm. The "HostRouteConfig" similarly may support regular expressions for the host destinations.

RouteConfig/HostRouteConfig Class 233 may include: String peerFQDN. PeerFQDN may include the identity of the peer to send a request to when the route is used.

RouteConfig/HostRouteConfig Class 233 may include: String Destination. 'Destination' may be defined as the destination realm/destination host to compare the request against. The destination may be a wildcard value which indicates that all destinations match the route config.

RouteConfig/HostRouteConfig Class 233 may include: Boolean useRegexMatch. useRegexMatch may indicate whether the Destination should be compared strictly against the Destination-Host/Realm of the request, or whether a regular expression match should be done.

RouteConfig/HostRouteConfig Class 233 may include: Integer Application. 'Application' may be the diameter application to compare the request against. The application can be a wildcard value which indicates that all applications match the rout configuration.

RouteConfig/HostRouteConfig Class 233 may include: Integer priority. 'Priority' may be the priority of the route relative to other routes.

A RouteConfig may match a request if the configuration's application matches the application of the request and the configuration's destination matches the Destination-Realm of the request.

A HostRouteConfig may match a request if the configuration's application matches the application of the request and the configuration's destination matches the Destination-Host of the request.

DestinationSelector

Class DestinationSelector 234 may be a class defined for tracking the state of the routing of a request.

Class DestinationSelector 234 may include: List <String, String>. 'List' may include destinations or an ordered list of Destination-Host/Destination-Realm pairs that other plugins have generated that indicate the desired destination(s) for the request to be sent to. Either of Destination-Host or Destination-Realm may be empty, but at least one of them should be populated.

Class DestinationSelector 234 may include: Integer destinationIndex. DestinationIndex may be defined as an index into 'destinations' to keep track of which destination the DRA is currently trying to send the request to.

Class DestinationSelector 234 may include: Boolean shouldDestinationAvpBeSet. ShouldDestinationAvpBeSet may define whether or not the Destination-Host/Destination-Realm from 'destinations' should be put into the diameter request when it is routed, or should the request be routed without populating those AVPs.

Class DestinationSelector 234 may include: List <DiameterPeer> peers. 'Peer' may include the ordered list of peer(s) to which the request should be sent for the currently chosen destination.

Class DestinationSelector 234 may include: List <RouteConfig/HostRouteConfig> applicableRoutes. 'ApplicableRoutes' may include a list of diameter/host routes to use when forwarding the request to the currently chosen destination (entries in this list match the entries in 'peers' one-to-one.) A null entry may indicate that the corresponding peer entry was not chosen by a route, but was chosen because the peer is the destination of the request.

Additionally, the DestinationSelector may either contain a copy of or reference, the 'retryableResultCodes', 'timeout', 'numberOfSendAttempts' and 'preferHostRoutes' values from the RoutingConfig that matched the request being routed.

The DestinationSelector class may be associated with a request and its information may be used by the routing logic to route the request, including resending the request multiple times to one or more destinations, if previous attempts to route the request fail.

Figure 3:
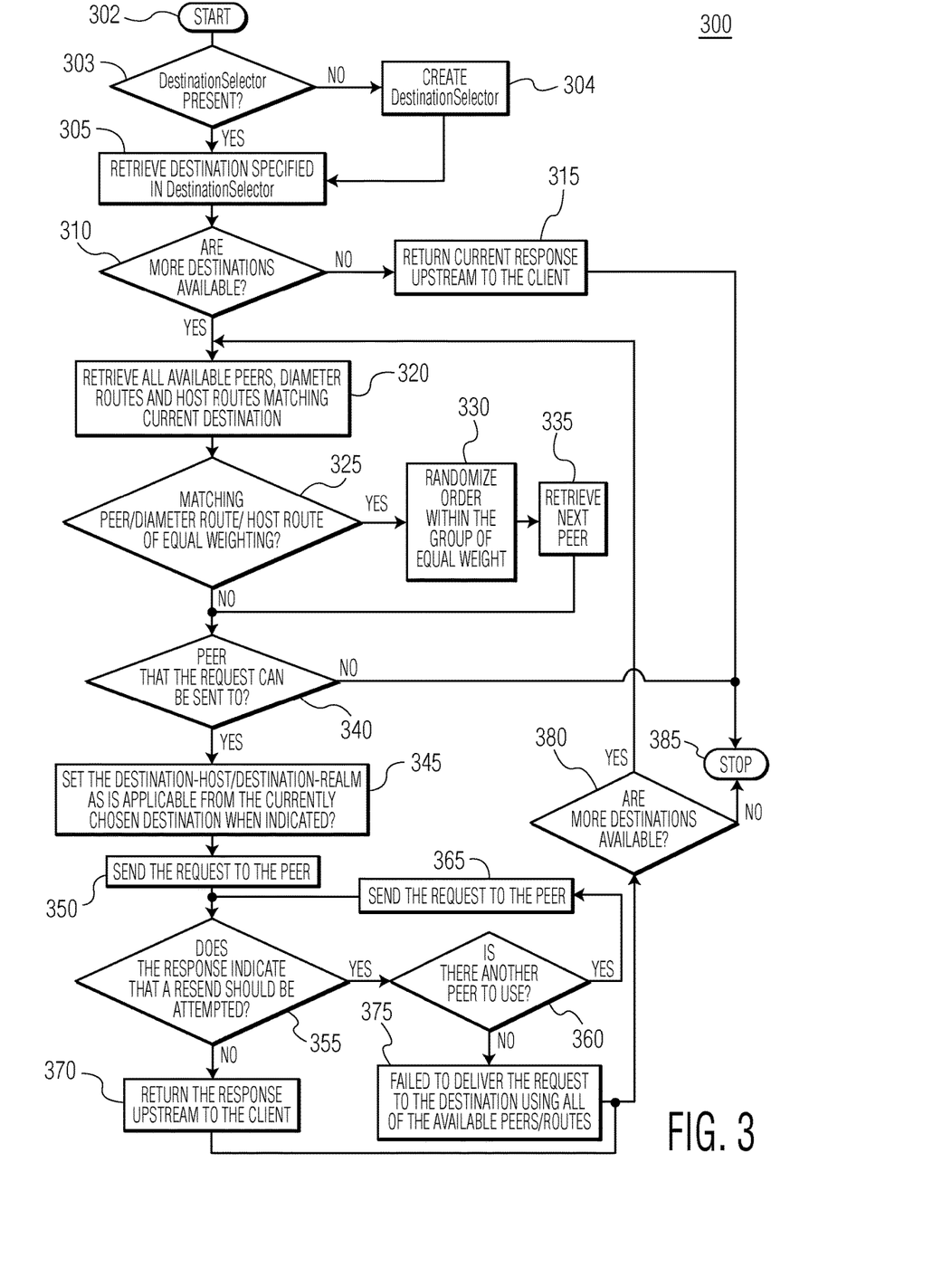
FIG. 3 illustrates an exemplary method for routing Diameter messages.

FIG. 3 illustrates an exemplary method for routing Diameter messages 300. DRA 142 may perform method 300 to apply routing logic utilizing routing logic plugin 232. Method 300 may use logic in routing plugin 232 that uses the information in the DestinationSelector to make routing decisions.

A routing decision may include the determination of what peer to send a request to based, in order, on:

The destination is a peer;

A diameter route matches the request and the peer from the diameter route is where the request will be sent to; OR A host route matches the request and the peer from the host route is where the request will be sent to.

Routing logic plugin 230 may check whether there is a DestinationSelector class 234 associated with the current request. If so, that indicates that the request should be routed by the routing plugin. The plugin then evaluates the filters in its list of RoutingConfigs. If it finds a match, it uses the information in that configuration to assist in the routing logic.

Method 300 may begin in step 302 and proceed to step 303 where DRA 142 may determine whether a Destination-Selector class is present. When no DestinationSelector is present, the routing plugin may proceed to step 304 where it may create a DestinationSelector based on the values of the Destination-Host and Destination-Realm Attribute Value Pairs of the request. DRA 142 may then proceed to step 305. When a DestinationSelector is present, DRA 142 may proceed to step 305 where it may retrieve a destination specified in the DestinationSelector class 234. DRA 142 may proceed to step 310 to determine whether more destinations are available. If there are no more destinations available then, DRA 142 may proceed to step 315 where it may return the current response upstream to the client. For example, on the first iteration through the loop, this would mean there were no destinations and a response must be created locally. DRA 142 may proceed from step 315 to step 385 where it may stop.

When there are more destinations available, then DRA 142 may proceed to step 320 where it may find all of the available peers, diameter routes and host routes that match the current destination. DRA 142 may proceed to step 325 where it may determine if the matching peer/diameter route/host route is of equal weighting. When the matching peer/diameter route/host route is of equal weighting DRA 142 may proceed to step 330 where it may randomize the order within the group of equal weight. Randomization may be done to allow for system-wide balanced routing. DRA 142 may then proceed to step 335 where it may retrieve the next peer and proceed to step 340.

When the matching peer/diameter route/host route is not of equal weighting DRA 142 may proceed to step 340 where it may determine if there is a peer that the request can be sent to. When there is a peer that the request can be sent to, DRA 142 may proceed to step 345, else it may proceed to step 385 where it may stop.

In step 345, DRA 142 may set the Destination-Host/Destination-Realm as is applicable from the currently chosen destination if it is indicated. DRA 142 may then proceed to step 350 where it may send the request to the peer.

DRA 142 may then proceed to step 355 where it may check if the response is a response that indicates a resend should be attempted. When the response is a response that indicates a resend should be attempted, DRA 142 may proceed to step 360, otherwise it may proceed to step 370.

In step 360 DRA 142 may check if there is another peer to use. When there is another peer to use DRA 142 may proceed to step 365 where it may send the request to the peer. DRA 142 may then proceed to step 355.

In step 360, when there is not another peer to use, DRA 142 may proceed to step 375 where DRA 142 may identify that there was a failure to deliver the request to the destination using all of the available peers/routes. DRA 142 may then proceed to step 380 where it may determine if there are more destinations available.

In step 370 DRA 142 may return the response upstream to the client and proceed to step 380 where it may determine if there are more destinations available.

In step 380, DRA 142 may proceed to step 385 and stop when it determines that there are not more destinations available. DRA 142 may similarly proceed to step 320 when it determines there are more destinations available.

Figure 4:
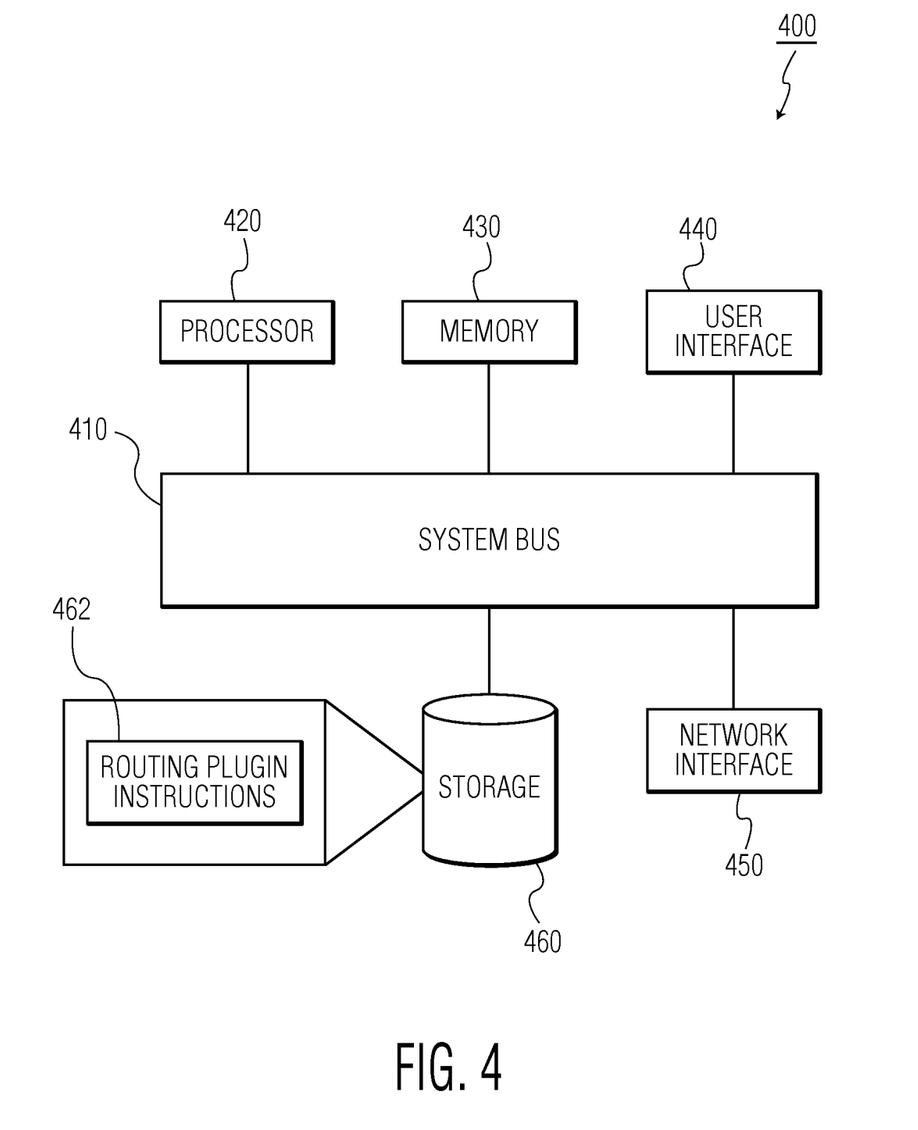
FIG. 4 illustrates an example of a hardware system.

FIG. 4 illustrates an example of a hardware system 400 for implementing the routing schemes described herein. The hardware system 400 may correspond to virtually any device that may participate in the routing management such as, for example, a laptop, mobile communications device, server, blade, node, transmitter, receiver, or other device.

As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in the memory 430 or the storage 460. As such, the processor may include a microprocessor, field programmable gate array (FPGA), application-specific integrated circuit (ASIC), or other similar devices.

The memory 430 may include various memories such as, for example L6, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands. In some embodiments, the user interface 440 may include a command line interface or graphical user interface that may be presented to a remote device via the network interface 450.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols, for example. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon which the processor 420 may operate.

It will be apparent that various information described as stored in the storage 460, may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

In some embodiments, storage 460 may contain routing plugin instructions 462, for example. Routing plugin instructions 462 may include instructions related to routing logic plugin 230, routingconfig class 232 and destination-selector class 234.

While the hardware device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Various additional arrangements will be apparent.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
   receiving the Diameter message at the DRA;
   determining whether there is a destination selection associated with the Diameter message;
   when a routing plugin determines that the destination selection is associated with the Diameter message, routing the Diameter message by determining, by the routing plugin, whether there is a routing configuration match by evaluating a set of filters in a list of routing configurations in the routing plugin; and
   transmitting the Diameter message based on the evaluation.

2. The method according to claim 1, wherein the evaluation further comprises:
   retrieving a destination specified in the destination selection; and
   retrieving available peers, Diameter routes, and host routes which match the destination specified.

3. The method according to claim 2, wherein the evaluation further comprises:
   when a matching peer or Diameter route or host route are of equal weighting, randomizing an order within a group of equal weight.

4. The method according to claim 3, wherein the evaluation further comprises:
   when the matching peer or Diameter route or host route are not of equal weighting, identifying a peer that the request can be sent to.

5. The method according to claim 4, wherein the evaluation further comprises:
   setting a destination host and a destination realm according to a currently chosen destination.

6. The method according to claim 5, wherein the evaluation further comprises:
   sending the request to the peer,
   sending the request to a different peer when a response indicates a resend should be attempted; and
   determining whether more destinations are available.

7. The method according to claim 1, further comprising:
   when the destination selection is absent, creating the destination selection based on values of the Destination-Host and Destination-Realm Attribute Value Pairs of the request.

8. A Diameter Routing Agent (DRA) for processing a Diameter message, the DRA comprising:
   a rule storage configured to store a plurality of sets of rules and plugins;
   a Diameter stack configured to receive the Diameter message;
   a message handler implemented as hardware and configured to determine whether there is a destination selection associated with the Diameter message, when a routing plugin determines that the destination selection is associated with the Diameter message, route the Diameter message by determining, by the routing plugin, whether there is a routing configuration match by evaluating a set of filters in a list of routing configurations in the routing plugin, and transmit the Diameter message based on the evaluation.

9. The DRA of claim 8, wherein the message handler is further configured to retrieve a destination specified in the destination selection, and retrieve available peers, Diameter routes, and host routes which match the destination specified.

10. The DRA of claim 9, wherein the message handler is further configured to, when a matching peer or Diameter route or host route are of equal weighting, randomize an order within a group of equal weight.

11. The DRA of claim 10, wherein the message handler is further configured, when the matching peer or Diameter route or host route are not of equal weighting, to identify a peer that the request can be sent to.

12. The DRA of claim 11, wherein the message handler is further configured to set the destination host and destination realm according to a currently chosen destination.

13. The DRA of claim 12, wherein the message handler is further configured to send the request to the peer, send the request to a different peer when a response indicates a resend should be attempted, and determine whether more destinations are available.

14. The DRA of claim 8, wherein the message handler is further configured to when the destination selection is absent, create the destination selection based on values of the Destination-Host and Destination-Realm Attribute Value Pairs of the request.

15. A non-transitory machine-readable storage medium encoded with instructions for execution by a Diameter Routing Agent (DRA) for processing a Diameter message, the medium comprising:

instructions for receiving the Diameter message at the DRA;

instructions for determining whether there is a destination selection associated with the Diameter message;

instructions for when routing plugin determines that the destination selection is associated with the Diameter message, routing the Diameter message by determining, by the routing plugin, whether there is a routing configuration match by evaluating a set of filters in a list of routing configurations in the routing plugin; and instructions for transmitting the Diameter message based on the evaluation of the routing plugin.

16. The non-transitory machine-readable storage medium of claim 15, further comprising:

instructions for retrieving a destination specified in the destination selection; and instructions for retrieving available peers, Diameter routes, and host routes which match the destination specified.

17. The non-transitory machine-readable storage medium of claim 16, further comprising:

when a matching peer or Diameter route or host route are of equal weighting, instructions for randomizing an order within a group of equal weight.

18. The non-transitory machine-readable storage medium of claim 17, further comprising:

when the matching peer or Diameter route or host route are not of equal weighting, instructions for identifying a peer that the request can be sent to.

19. The non-transitory machine-readable storage medium of claim 18, further comprising:

instructions for setting a destination host and a destination realm according to a currently chosen destination.

20. The non-transitory machine-readable storage medium of claim 19, further comprising:

instructions for sending the request to the peer, instructions for sending the request to a different peer when a response indicates a resend should be attempted; and instructions for determining whether more destinations are available.

* * * * *